United States Patent
Du et al.

(10) Patent No.: US 10,198,134 B2
(45) Date of Patent: Feb. 5, 2019

(54) SHADOW ELIMINATION ARRANGEMENT, TOUCH SCREEN AND METHOD FOR PRODUCING THE SAME

(71) Applicants: BOE Technology Group Co., Ltd., Beijing (CN); Hefei Xinsheng Optoelectronics Technology Co., Ltd., Anhui (CN)

(72) Inventors: Zhi Du, Beijing (CN); Ming Hu, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 233 days.

(21) Appl. No.: 15/121,447

(22) PCT Filed: Jul. 24, 2015

(86) PCT No.: PCT/CN2015/085030
§ 371 (c)(1),
(2) Date: Aug. 25, 2016

(87) PCT Pub. No.: WO2016/141664
PCT Pub. Date: Sep. 15, 2016

(65) Prior Publication Data
US 2017/0017319 A1    Jan. 19, 2017

(30) Foreign Application Priority Data
Mar. 11, 2015 (CN) .......................... 2015 1 0106334

(51) Int. Cl.
*B32B 3/00* (2006.01)
*G06F 3/044* (2006.01)

(52) U.S. Cl.
CPC .... *G06F 3/044* (2013.01); *G06F 2203/04103* (2013.01)

(58) Field of Classification Search
CPC ................. G06F 3/044; G06F 3/03547; G06F 2203/04103
See application file for complete search history.

(56) References Cited

U.S. PATENT DOCUMENTS 9,886,148 B2 * 2/2018 Liu .......................... G06F 3/044
2014/0240616 A1   8/2014 Huang et al.

FOREIGN PATENT DOCUMENTS

CN    102289334 A    12/2011
CN    102779570 A    11/2012
(Continued)

OTHER PUBLICATIONS

International Search Report and Written Opinion, including English translation of Box No. V, for International Application No. PCT/CN2015/085030, dated Dec. 25, 2015, 12 pages.
(Continued)

*Primary Examiner* — Elizabeth E Mulvaney
(74) *Attorney, Agent, or Firm* — Westman, Champlin & Koehler, P.A.

(57) ABSTRACT

Embodiments of the present application provide a shadow elimination arrangement, a touch screen and a method for producing the same. The shadow elimination arrangement for a pattern of an ITO layer includes a silicon oxynitride layer, on which the pattern of the ITO layer is provided, being provided on a transparent substrate; and a silicon dioxide layer, provided over the pattern of the ITO layer.

18 Claims, 3 Drawing Sheets

(56) References Cited

FOREIGN PATENT DOCUMENTS

| | | |
|---|---|---|
| CN | 202758338 U | 2/2013 |
| CN | 202771813 U | 3/2013 |
| CN | 203191952 U | 9/2013 |
| CN | 203276237 U | 11/2013 |
| CN | 203311396 U | 11/2013 |
| CN | 103570254 A | 2/2014 |
| CN | 103699286 A | 4/2014 |
| CN | 104007860 A | 8/2014 |
| CN | 104049825 A | 9/2014 |
| CN | 203930777 U | 11/2014 |
| CN | 104635991 A | 5/2015 |
| CN | 204537091 U | 8/2015 |

OTHER PUBLICATIONS

Third Office Action, including Search Report, for Chinese Patent Application No. 201510106334.1, dated Mar. 27, 2018, 14 pages.
First Office Action, including Search Report, for Chinese Patent Application No. 201510106334.1, dated Feb. 27, 2017, 14 pages.
Second Office Action for Chinese Patent Application No. 201510106334.1, dated Oct. 27, 2017, 14 pages.

\* cited by examiner

SHADOW ELIMINATION ARRANGEMENT, TOUCH SCREEN AND METHOD FOR PRODUCING THE SAME

CROSS-REFERENCE TO RELATED APPLICATION

This application is a Section 371 National Stage Application of International Application No. PCT/CN215/085030, filed on 24 Jul. 2015 and entitled with "Shadow Elimination Arrangement, Touch Screen and Method for Producing the Same", which claims priority to Chinese Patent Application No. 201510106334.1, filed on Mar. 11, 2015 entitled with "a shadow elimination arrangement, a touch screen and a method for producing the same" in the State Intellectual Property Office of China, the disclosures of which are incorporated herein by their reference.

BACKGROUND OF THE INVENTION

Field of the Invention

The present disclosure relates to the field of display and touch, and particularly, to a shadow elimination arrangement, a touch screen and a method for producing the same.

Description of the Related Art

Currently, as for mainstream arrangements used in a field of capacitance type touch screen, an ITO layer is served typically as a touch electrode layer. Specifically, one ITO layer is deposited onto a glass, and an ITO electrode pattern required by the touch is formed after the procedures such as lithography and etching, and finally a touch sensor (for example an OGS arrangement (i.e., glass/insulation frame/ITO or glass/insulation frame/shadow elimination layer/ITO) or a G/G arrangement (i.e., one piece of glass is used as a touch sensor and another piece of glass is used as a protection glass)) is formed by adding an insulation bridge, a metal conductive circuit, a protection layer and the like.

However, after etching the ITO layer to form a patterned region and a non-patterned region, since a difference between reflectivities of them is too large, the etching texture becomes relatively apparent, thereby causing a degradation of a visual effect. In order to solve the above problems, a single layer or multiple layers of structure consisted of $Nb_2O_5$ film and $SiO_2$ film is/are typically deposited between a substrate and an electrode in the prior art. But the technical effects thereof are not desired. Furthermore, on basis of these solutions, if it is necessary to observe the result of the shade elimination, then it must have to be done after etching the ITO layer and forming the pattern. In this way, it will take a long time, and once the defect of shade elimination appears, it will also result in huge loss.

Therefore, a shadow elimination structure, a touch screen and a method for producing the same is indeed needed, which can effectively eliminate the problem of etching texture to be apparent.

SUMMARY

One objective of the present application is to provide a shadow elimination arrangement, a touch screen and a method for producing the same, which is capable of effectively eliminate etching textures formed after a pattern is formed by etching the ITO layer.

Another objective of the present application is to provide a shadow elimination arrangement, a touch screen and a method for producing the same, which can improve transmittivity of the touch screen.

In accordance with one aspect of the present application, it provides a shadow elimination arrangement for a pattern of an ITO layer, comprising:

a silicon oxynitride layer, on which the pattern of ITO layer is provided, being provided on a transparent substrate; and a silicon dioxide layer, provided over the pattern of the ITO layer.

In one example, refractivity of the silicon oxynitride layer is in a range of 1.47-2.0.

In one example, the pattern of the ITO layer comprises a patterned region and a non-patterned region of ITO layer, and the refractivity of the silicon oxynitride layer is selected according to a difference between reflectivity of the patterned region and that of the non-patterned region in the pattern of the ITO layer.

In one example, the refractivity of the silicon oxynitride layer is adjusted by adjusting a ratio of oxygen atoms and nitrogen atoms within the silicon oxynitride layer during a disposition process thereof.

In one example, the refractivity of the silicon oxynitride layer and thicknesses of the silicon oxynitride layer and the silicon dioxide layer are determined depending on a thickness of the ITO layer, so that the reflectivity of the patterned region and the reflectivity of the non-patterned region are approximately equal or equal with each other.

In one example, the silicon dioxide layer is configured to protect the ITO layer.

In accordance with another aspect of the present application, it provides a touch screen, comprising the shadow elimination arrangement as described above.

In one example, the touch screen further comprising a first insulation protection layer, a metal layer and a second insulation protection layer arranged in sequence between the ITO layer and the silicon dioxide layer.

In one example, the shadow elimination arrangement further comprises a binding region, in which the metal layer and a flexible circuit board are electrically connected by a binding wire via a via hole passing through the silicon dioxide layer and the second insulation protection layer.

In one example, the touch screen comprises an insulation frame on the transparent substrate.

In accordance with a further aspect of the present application, it provides a method for producing a touch screen, comprising:

providing a transparent substrate;

forming a silicon oxynitride layer onto the transparent substrate;

forming a pattern of an ITO layer onto the silicon oxynitride layer;

forming a first insulation protection layer, a metal layer and a second insulation protection layer in sequence on the ITO layer;

depositing a silicon dioxide layer on the second insulation protection layer, wherein the silicon oxynitride layer and the silicon dioxide layer constitute a shadow elimination arrangement;

forming a via hole in the silicon dioxide layer and the second insulation protection layer, and binding the metal layer to a flexible circuit board by a binding wire passing though the via hole, thereby forming the touch screen.

In one example, the method further comprising:

making a patterned region and a non-patterned region of the ITO layer by a lithography process.

In one example, the silicon oxynitride layer is deposited at a temperature in a range of 180° C.-220° C.

In one example, the method further comprising a pre-adjusting step, in which refractivity of the silicon oxynitride layer and the thicknesses of the silicon oxynitride layer and the silicon dioxide layer are determined depending on a thickness of the ITO layer, so that reflectivity of the patterned region and reflectivity of the non-patterned region are approximately equal or equal with each other.

In one example, the step of forming the via hole comprises etching away silicon dioxide and second insulation protection adhesive in the silicon dioxide layer and the second insulation protection layer corresponding to the region where the via hole is located.

In one example, before depositing the silicon oxynitride layer, the method further comprises:

manufacturing an insulation frame on the transparent glass substrate.

Embodiments of the present application provide a shadow elimination arrangement, a touch screen and a method for producing the same. The shadow elimination arrangement and the ITO layer constitute an arrangement of silicon oxynitride layer/ITO layer/silicon dioxide, wherein each layer is a single layer. Because the silicon dioxide layer is deposited and formed after etching the ITO layer to form its pattern, it can provide an additional protection to the ITO layer, to effectively eliminate the problem that the etching texture caused by the etching the ITO layer to form its pattern becomes apparent, and also can directly observe the effect of shadow elimination of the shadow elimination arrangement after depositing the ITO layer, thereby it can find out the defect of the shadow elimination occurring the in production in time.

DETAINED DESCRIPTION OF PREFERRED EMBODIMENTS OF THE INVENTION

Below, technical solutions of embodiments of the present application will be described clearly and completely in conjunction with the attached drawings of these embodiments. It is apparent that the described embodiments are only part of embodiments of the present application, rather than all of the embodiments of the present application. On basis of the present embodiments, all other embodiments which are obtained by the person skilled in the art without any creative efforts, shall belong to the scope of the present application.

In the following, a shadow elimination arrangement, a touch screen and a method for producing the same provided by embodiments of the present application will be described in detail with reference to the drawings thereof.

Figure 1:
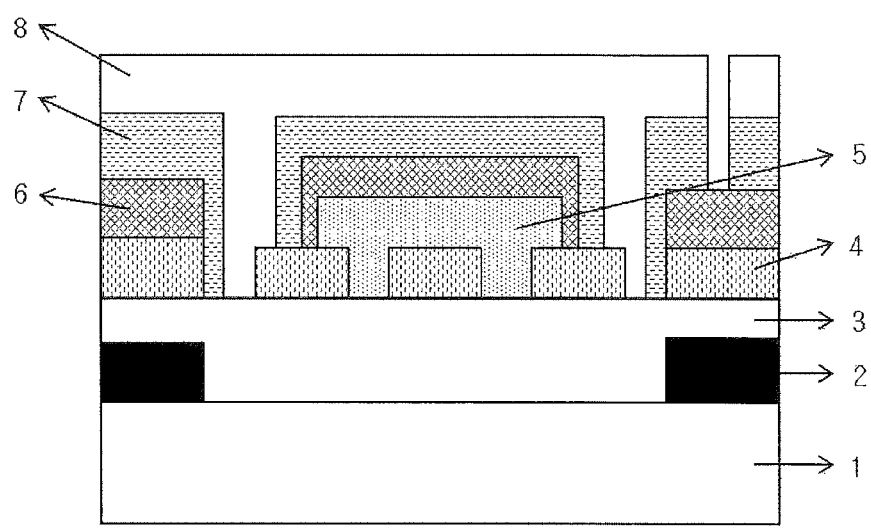
FIG. 1 is a schematic view for showing a structure of a shadow elimination arrangement in accordance with an embodiment of the present application.

FIG. 1 is a schematic view for showing a structure of a shadow elimination arrangement provided by an embodiment of the present application. As shown in FIG. 1, the embodiment of the present application provides a shadow elimination arrangement of a pattern of an ITO layer. The shadow elimination arrangement includes a silicon oxynitride layer 3 provided on a transparent substrate 1, and the pattern of ITO layer 4 is disposed or formed on the silicon oxynitride layer 3.

Besides the silicon oxynitride layer 3, the shadow elimination arrangement further includes a silicon dioxide layer 8 located over the ITO layer 4. The definition of "the silicon dioxide layer located over the ITO layer" is meant that the silicon dioxide layer is directly provided on the ITO layer or an intermediate layer such as an insulation protection layer and/or a metal layer is provided between the silicon dioxide layer and the ITO layer, but the silicon dioxide layer is located above the ITO layer when observing from a side where the transparent substrate is located.

It should be noted that the pattern of the ITO layer 4 described herein includes a patterned region and a non-patterned region, or is meant to a structure that the ITO layer is imparted with a pattern after a lithographic process.

In the present embodiment, the silicon oxynitride layer 3 is disposed below the ITO layer 4. Because the silicon oxynitride layer 3 has refractivity in a variable range and the thickness thereof changes as the thickness of the ITO layer 4 varies, the difference between reflectivity of the patterned region and reflectivity of the non-patterned region within the pattern of the ITO layer 4 can be effectively adjusted. Furthermore, the silicon dioxide layer 8 is provided above the ITO layer 4 and thus can provide an additional protection to the touch screen sensor.

In an example of the present application, after forming the pattern of ITO layer 4, an effect of the shadow elimination can be intuitively observed, and a combination of the silicon oxynitride layer and the silicon dioxide layer can effectively eliminate the defect of the visual effect caused by the etching texture.

An embodiment of the present application provides a shadow elimination arrangement, The shadow elimination arrangement and the ITO layer constitute an arrangement of silicon oxynitride layer/ITO layer/silicon dioxide layer. That is, a single layer of silicon oxynitride layer and a single layer of silicon dioxide are formed below and above the ITO layer respectively. Because the silicon dioxide layer is deposited and formed after etching the ITO layer to form its pattern, it can provide an additional protection to the ITO layer. In this way, it can effectively eliminate the problem that the etching texture caused by the etching the ITO layer to form its pattern becomes apparent, and also can directly observe the effect of shadow elimination of the shadow elimination arrangement after depositing the ITO layer, thereby it can find out the failure of the shadow elimination occurring in production in time.

In an example of the present application, the refractivity of the silicon oxynitride layer 3 varies in a range of 1.47-2.0. In the present example, the refractivity of the silicon oxynitride layer 3 can be adjusted by adjusting a ratio of oxygen and nitrogen during the deposition. The refractivity of the silicon oxynitride layer and thicknesses of the silicon oxynitride layer and the silicon oxide layer will change as the thickness of the ITO layer varies, so that the reflectivity of the patterned region and the reflectivity of the non-patterned region in the pattern of the ITO layer formed after etching the ITO layer can be adjusted to be approximately equal or equal with each other. Thus, the problem that the etching texture caused by etching the ITO layer to form the pattern becomes apparent, can be effectively eliminated, and transitivity of the touch screen can be further improved. It should be understood that the refractivity of a film of the silicon oxynitride layer 3 can be any value within the range of 1.47-2.0, for example, 1.64, 1.70 or the like. In addition, the technical means of adjusting the ratio of the oxygen and the nitrogen can be performed by a conventional technical means well known by the person skilled in the art and is not repeatedly discussed herein.

It should be noted that the shadow elimination arrangement provided by the present embodiment is not only applicable into the OGS structure, but also can be applied into any structures in which the pattern of the ITO layer is used as the conductive electrode.

An embodiment of the present application provides a touch screen, for example, a capacitance type touch screen, including the shadow elimination arrangement described by the above embodiment. An embodiment of the present application provides a touch screen including the shading elimination arrangement provided by the present application. Since such shadow elimination arrangement can effectively eliminate the problem that the etching texture becomes apparent, and thus the touch screen can obtain a good visual effect when it is applied into the touch screen provided by the embodiment of the present application.

In one embodiment of the present application, a first insulation protection layer (for example a first insulation protection adhesive layer) 5, a metal layer 6 and a second insulation protection layer (for example a second insulation protection adhesive layer) 7 are included within the shadow elimination arrangement and arranged in sequence between the ITO layer 4 and the silicon dioxide layer 8. In the present embodiment, the first insulation protection layer 5 can function as an insulation bridge point. The metal layer 6 can be formed with a bridge connecting a metal lead and an electrode. The second insulation protection layer 7 can function as a protection layer of the metal lead and the bridge. Because the first insulation protection layer 5, the metal layer 6 and the second insulation protection layer 7 are essential parts of the touch screen, and are well known for those skilled in the art, they are not discussed in detail. It should be noted that the first and second insulation protection layers 5 and 7 are formed by the insulation protection adhesives in the present example.

In an embodiment of the present application, the shadow elimination arrangement includes a binding region in which a binding wire electrically connects the metal layer 6 with a flexible circuit board by a via hole passing through the silicon dioxide layer 8 and the second insulation protection layer 7. In the present embodiment, because as described above the metal layer 6 has formed with a bridge connecting the metal lead with the electrode, an electrical connection of the metal layer 6 with the flexible circuit board can be achieved by such via hole.

Figure 2:
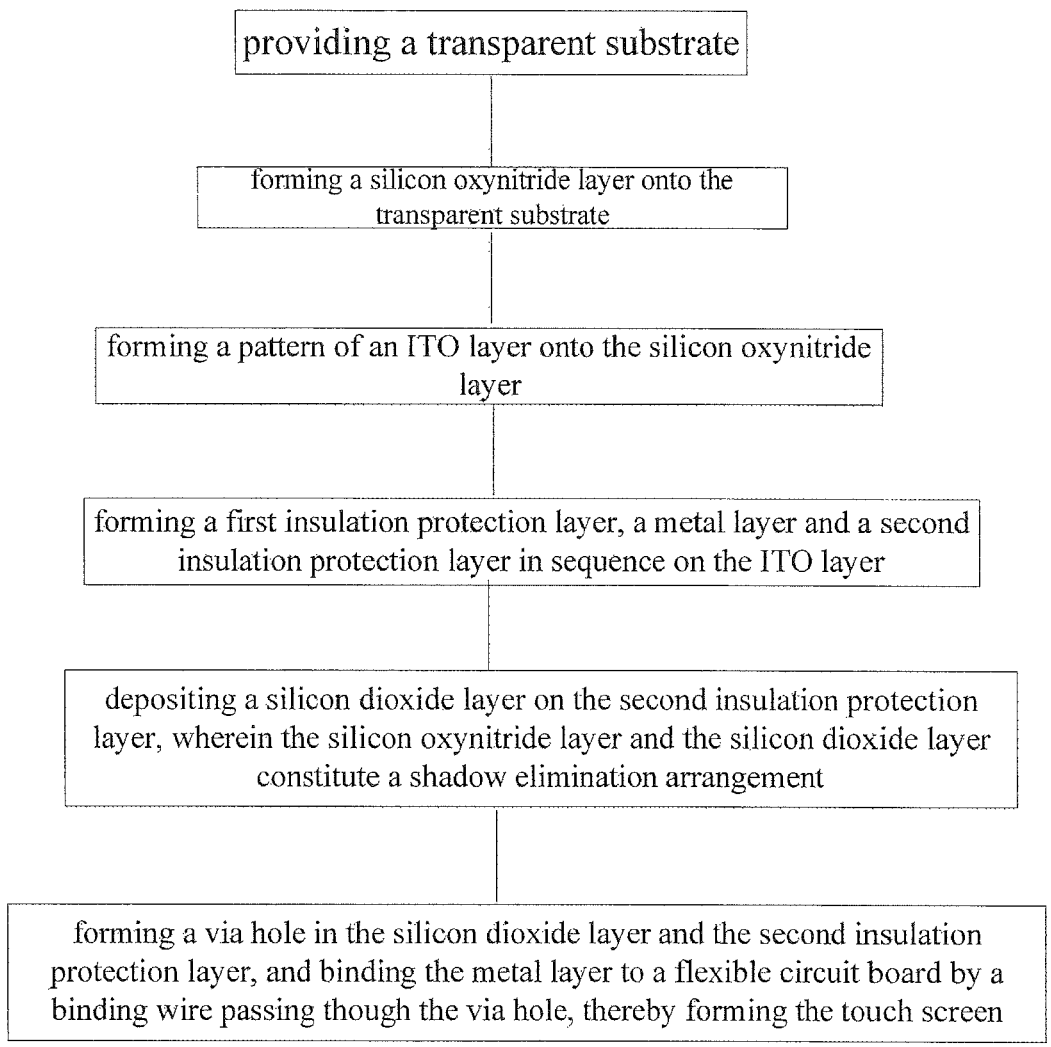
FIG. 2 is a schematic view of a method for producing a touch screen in accordance with an embodiment of the present application.

FIG. 2 is a schematic view of a method for producing the touch screen provided by an embodiment of the present application. As shown in FIG. 2, the embodiment of the present application provides the method for producing the touch screen as described by the above embodiment. The method includes:

providing a transparent substrate 1;

depositing a silicon oxynitride layer 3 onto the transparent substrate 1;

forming a pattern of an ITO layer 4 onto the silicon oxynitride layer 3 (for example, by the procedures such as sputtering, lithographic exposing, etching, and developing or the like);

forming a first insulation protection layer 5, a metal layer 6, a second insulation protection layer 7 in sequence on the pattern of the ITO layer 4;

forming (for example, depositing) a silicon dioxide layer 8 onto the second insulation protection layer 7, wherein in the present example the silicon oxynitride layer 3 and the silicon dioxide layer 8 constitute the shadow elimination arrangement;

binding a metal layer to a flexible circuit board by a binding wire, after etching away a part of the silicon dioxide layer and the second insulation protection layer corresponding to a binding region of the shadow elimination arrangement, thereby forming the touch screen.

In the present embodiment, the shadow elimination arrangement and the pattern of the ITO layer constitute the arrangement of the silicon oxynitride layer 3/ITO layer 4/silicon dioxide layer 8. As compared with other solutions in the prior art, such as depositing the ITO layer after depositing the shadow elimination layer, the present arrangement can provide an additional protection layer to the touch screen sensor, since in the shadow elimination arrangement provided by the present application the silicon dioxide layer is deposited after etching the ITO layer to form the pattern. In addition, the shadow elimination effect can be intuitively observed after forming the pattern of the ITO layer in the present application, and thus it is possible to find out the defect of shadow elimination occurring in the production in time.

The present embodiment provides a method for producing the touch screen in which the shadow elimination arrangement is produced onto the transparent substrate. Since the silicon dioxide layer is deposited and formed after etching the ITO layer to form the pattern thereof, it can provide an additional protection to the ITO layer, and can eliminate the problem that the etching texture caused by etching the ITO layer to form the pattern thereof becomes apparent, and it allows to directly observe the effect of shadow elimination of the shadow elimination arrangement after depositing the ITO layer, thereby finding out the defect of shadow elimination occurring in the production. This method operates simply and the touch screen obtained and produced by such method can present a good visual effect.

In one embodiment of the present application, before the step of depositing the silicon oxynitride layer 3, the ITO layer 4 and the silicon dioxide layer 8 in sequence onto the transparent substrate 1, the producing method further includes producing the pattern of the ITO layer 4 which includes the patterned region and the non-patterned region; and adjusting the refractivity of the silicon oxynitride layer 3 and the thicknesses of the silicon oxynitride layer 3 and the silicon dioxide layer 8 according to the thickness of the ITO layer 4, so that the reflectivity of the patterned region and the reflectivity of the non-patterned region are approximately equal or equal with each other.

In the present embodiment, the thickness of the ITO layer 4 can be adjusted according to different production processes. When the ITO layer 4 becomes more and more thick, it tends to cause the problem of decrease of the transmittivity of the product correspondingly. The main reason for decrease of the transmittivity is too large difference between reflectivity of the patterned region and reflectivity of the non-patterned region formed after etching the ITO layer 4. Therefore, the difference between reflectivity of the patterned region and reflectivity of the non-patterned region on the ITO layer 4 is adjusted to be very small or even to be zero, by adjusting the refractivity of the silicon oxynitride layer 3, and the thicknesses of the silicon oxynitride layer 3 and the silicon dioxide layer 8, so that the ITO layer 4 has a relatively high transmittivity. It should be understood that this pre-adjusting step is performed before the step of depositing the silicon oxynitride layer 3, the ITO layer 4 and the silicon dioxide layer 8 in sequence on the transparent substrate 1. Specifically, after determining the thickness of the ITO layer 4, the refractivity of the silicon oxynitride layer 3, and the thicknesses of the silicon oxynitride layer 3 and the silicon dioxide layer 8 at which the difference between reflectivity of the patterned region and reflectivity of the non-patterned region in the pattern of the ITO layer 4 can be adjusted to be very small or even to be zero can be obtained, and then the silicon oxynitride layer, the ITO layer and the silicon dioxide layer are deposited in sequence onto the transparent substrate according to the above parameters, thereby ensuring the high transmittivity of the touch screen.

In one embodiment of the present application, the silicon oxynitride layer 3 is deposited at a temperature in a range of 180° C.-220° C. In the present embodiment, taking into consideration of the heat-resistance performance of the insulation frame adhesive on the transparent substrate before depositing the silicon oxynitride layer 3 and the entire performance of the shadow elimination arrangement formed thereby, the deposition of the silicon oxynitride layer 3 is selected to be performed at the lower temperature, i.e., at a temperature in a range of 180° C.-220° C. Preferably, the silicon oxynitride layer is deposited at a temperature of about 200° C.

In one embodiment of the present application, after depositing the ITO layer 4 but before depositing the silicon dioxide layer 8, the producing method further includes forming the first insulation protection layer 5, the metal layer 6 and the second insulation protection layer 7 in sequence on the ITO layer 4.

In the present embodiment, after the ITO layer 4 is etched to form the patterned region and the non-patterned region, the first insulation protection layer 5 is formed on the patterned region by a lithographic process, serving as an insulation bridge point. Then, the metal layer 6 is deposited on the first insulation protection layer 5 by a sputtering process, and after completing the deposition the bridge for connecting the metal lead and the electrode is formed by the lithographic exposing and etching. After that, the second insulation protection layer 7 is formed on the metal layer 6 by a lithographic process, severing as a protection layer of the metal lead and the bridge. It should be understood that since the steps for producing the first insulation protection layer 5, the metal layer 6 and the second insulation protection layer 7 are necessary to produce the touch screen and are well known for those skilled in the art, the step of forming the first insulation protection layer 5, the metal layer 6 and the second insulation protection layer 7 in sequence on the ITO layer 4 is not set forth herein.

In one embodiment of the present application, before depositing the silicon oxynitride layer 3, the method further includes: producing an insulation frame 2 on the transparent glass substrate 1. In the present embodiment, the insulation frame 2 produced on the transparent glass substrate can be a light-shielding layer, so as to avoid the light-leaking phenomena caused by the shadow elimination arrangement.

The shadow elimination arrangement, the touch screen and the method for producing the same provided by the present application will be described in detail in conjunction with the specific examples.

Example 1

Firstly, a layer of insulation frame 2 is formed onto the glass substrate 1 by a lithographic process, severing as a light-shielding layer. The silicon oxynitride layer 3 is deposited after forming the insulation frame 2 by a mid frequency magnetron sputtering process. Taking into consideration of the heat-resistance performance of the insulation frame 2, the deposition of the silicon oxynitride layer is performed at a low temperature, i.e., temperature of about 200° C., and the silicon oxynitride layer 3 with a refractivity of 1.70 and a thickness of 65 nm is deposited by controlling the ratio of the nitrogen $N_2$ and the oxygen $O_2$. After depositing the silicon oxynitride layer 3, the ITO layer 4 which has refractivity of 1.92 and a thickness of 30 mm is deposited by a DC magnetron sputtering process. After depositing the ITO layer 4, the patterned region and the non-patterned region are formed by lithographic and etching process. After that, the first insulation protection layer 5 is formed on the patterned region of the ITO layer 4 by a lithographic process, severing as an insulation bridge point. Then, the metal layer 6 is deposited by a DC magnetron sputtering process, and after completing the deposition the bridge for connecting the metal lead and the electrode is formed by the lithographic exposing and etching. After that, the second insulation protection layer 7 is formed on the metal layer 6 by a lithographic process, severing as a protection layer of the metal lead and the bridge. Finally, the silicon dioxide layer 8 having a refractivity of 1.47 and a thickness of 65 nm is deposited by a mid frequency magnetron sputtering process. An etching paste for the silicon dioxide is produced by screen printing at the binding region, and after etching away the part of the silicon dioxide in the binding region the metal layer 6 is bound to the flexible circuit board (not shown), thereby forming a touch screen. The reflectivity of the patterned region and reflectivity of the non-patterned region formed on the ITO layer 4 is shown in FIG. 3.

Example 2

Firstly, a layer of insulation frame 2 is formed onto the glass substrate 1 by a lithographic process, severing as a light-shielding layer. The silicon oxynitride layer 3 is deposited after forming the insulation frame 2 by a mid frequency magnetron sputtering process. Taking into consideration of the heat-resistance performance of the insulation frame 2, the deposition of the silicon oxynitride layer is performed at a low temperature, i.e., temperature of about 200° C., and the silicon oxynitride layer 3 with a refractivity of 1.64 and a thickness of 80 nm is deposited by controlling the ratio of the nitrogen $N_2$ and the oxygen $O_2$. After depositing the silicon oxynitride layer 3, the ITO layer 4 which has refractivity of 1.92 and a thickness of 70 mm is deposited by a DC magnetron sputtering process. After depositing the ITO layer 4, the patterned region and the non-patterned region are formed by lithographic and etching process. After that, the first insulation protection layer 5 is formed on the patterned region of the ITO layer 4 by a lithographic process, severing as an insulation bridge point. Then, the metal layer 6 is deposited by a DC magnetron sputtering process, and after completing the deposition the bridge for connecting the metal lead and the electrode is formed by the lithographic exposing and etching. After that, the second insulation protection layer 7 is formed on the metal layer 6 by a lithographic process, severing as a protection layer of the metal lead and the bridge. Finally, the silicon dioxide layer 8 having a refractivity of 1.47 and a thickness of 70 nm is deposited by a mid frequency magnetron sputtering process. An etching paste for the silicon dioxide is produced by screen printing at the binding region, and after etching away the part of the silicon dioxide in the binding region the metal layer 6 is bound to the flexible circuit board, thereby forming a touch screen. The reflectivity of the patterned region and reflectivity of the non-patterned region formed on the ITO layer 4 is shown in FIG. 4.

Figure 3:
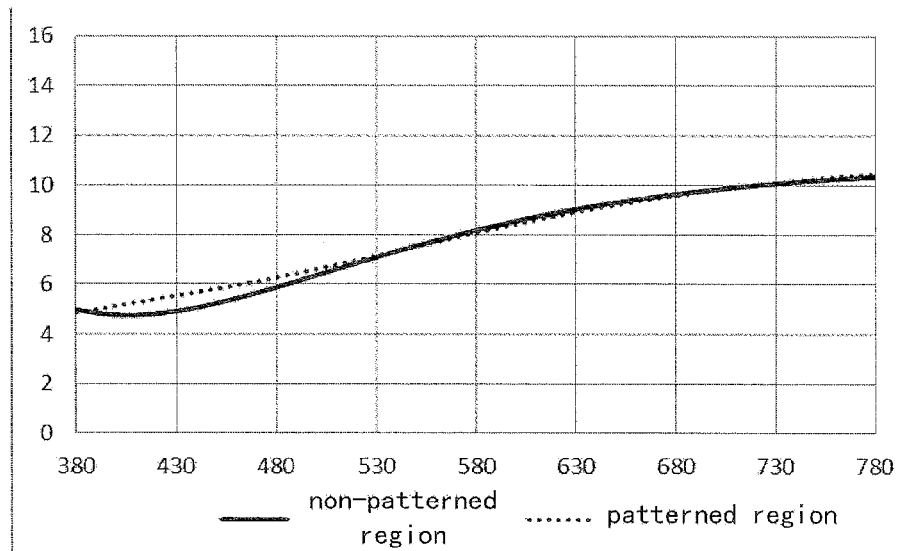
FIG. 3 is a comparison diagram of reflectivity of a patterned region and reflectivity of a non-patterned region in accordance with a first embodiment of the present application.
Figure 4:
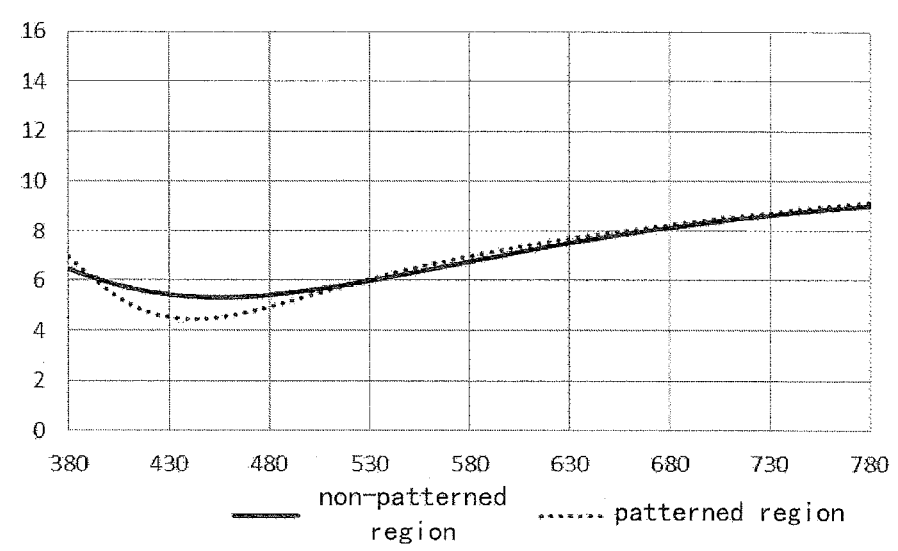
FIG. 4 is a comparison diagram of reflectivity of a patterned region and reflectivity of a non-patterned region in accordance with a second embodiment of the present application.

FIGS. 3 and 4 respectively show the average reflectivity of the patterned region and the average reflectivity of the non-patterned region formed on the ITO layer 4 in the Example 1 are less than 8%; and the average reflectivity of the patterned region and the average reflectivity of the non-patterned region formed on the ITO layer 4 in the Example 2 are less than 7%. Therefore, it can be apparent that the shadow elimination arrangement, the touch screen and the method for producing the same provided by the present application not only can effectively eliminate the problem that the etching texture caused by the too large difference between reflectivity of the patterned region and reflectivity of the non-patterned region becomes apparent and thus the visual effect is not good, but also can improve the transmittivity of the touch screen.

It is obvious that the above embodiments are only taken as an example for explanation clearly, rather than the limitation to the implementation thereof. As for those skilled in the art, other different changes or modifications can be made on basis of the above disclosure. All the embodiments are not exhaustively listed. In addition, the envisaged obvious changes or modification as described above shall still fall within the scope of the present application.

What is claimed is:

1. A touch screen, comprising:
   a shadow elimination arrangement for a pattern of an ITO layer, comprising:
      a silicon oxynitride layer, on which the pattern of the ITO layer is provided, being provided on a transparent substrate; and
      a silicon dioxide layer, provided above the pattern of the ITO layer, wherein a first insulation protection layer, a metal layer and a second insulation protection layer arranged in sequence between the ITO layer and the silicon dioxide layer.

2. The touch screen according to claim 1, wherein the shadow elimination arrangement further comprises a binding region, in which the metal layer and a flexible circuit board are electrically connected by a binding wire via a via hole passing through the silicon dioxide layer and the second insulation protection layer.

3. The touch screen according to claim 2, wherein the touch screen comprises an insulation frame on the transparent substrate.

4. The shadow elimination arrangement according to claim 1, wherein a refractivity of the silicon oxynitride layer is in a range of 1.47-2.0.

5. The shadow elimination arrangement according to claim 4, wherein the pattern of the ITO layer comprises a patterned region and a non-patterned region of the ITO layer, and the refractivity of the silicon oxynitride layer is selected according to a difference between reflectivity of the patterned region and that of the non-patterned region in the pattern of the ITO layer.

6. The shadow elimination arrangement according to claim 5, wherein the refractivity of the silicon oxynitride layer is adjusted by adjusting a ratio of oxygen atoms and nitrogen atoms within the silicon oxynitride layer during a disposition process thereof.

7. The shadow elimination arrangement according to claim 5, wherein the refractivity of the silicon oxynitride layer and thicknesses of the silicon oxynitride layer and the silicon dioxide layer are determined depending on a thickness of the ITO layer, so that the reflectivity of the patterned region and the reflectivity of the non-patterned region are approximately equal or equal with each other.

8. The shadow elimination arrangement according claim 7, wherein the silicon dioxide layer is configured to protect the ITO layer.

9. A method for producing a touch screen, comprising:
   providing a transparent substrate;
   forming a silicon oxynitride layer onto the transparent substrate;
   forming a pattern of an ITO layer onto the silicon oxynitride layer;
   forming a first insulation protection layer, a metal layer and a second insulation protection layer in sequence on the ITO layer;
   depositing a silicon dioxide layer on the second insulation protection layer, wherein the silicon oxynitride layer and the silicon dioxide layer constitute a shadow elimination arrangement;
   forming a via hole in the silicon dioxide layer and the second insulation protection layer, and binding the metal layer to a flexible circuit board by a binding wire passing though the via hole, thereby forming the touch screen.

10. The method according to claim 9, further comprising:
    making a patterned region and a non-patterned region of the ITO layer by a lithography process.

11. The method according to claim 9, wherein the silicon oxynitride layer is deposited at a temperature in a range of 180° C.-220° C.

12. The method according claim 10, further comprising a pre-adjusting step, in which refractivity of the silicon oxynitride layer and the thicknesses of the silicon oxynitride layer and the silicon dioxide layer are determined depending on a thickness of the ITO layer, so that reflectivity of the patterned region and reflectivity of the non-patterned region are approximately equal or equal with each other.

13. The method according to claim 9, wherein the step of forming the via hole comprises etching away silicon dioxide and second insulation protection adhesive in the silicon dioxide layer and the second insulation protection layer corresponding to the region where the via hole is located.

14. The method according to claim 9, wherein before depositing the silicon oxynitride layer, the method further comprises:
    manufacturing an insulation frame on the transparent substrate.

15. The touch screen according to claim 1, wherein a refractivity of the silicon oxynitride layer is in a range of 1.47-2.0.

16. The touch screen according to claim 15, wherein the pattern of the ITO layer comprises a patterned region and a non-patterned region of the ITO layer, and the refractivity of the silicon oxynitride layer is selected according to a difference between reflectivity of the patterned region and that of the non-patterned region in the pattern of the ITO layer.

17. The touch screen according to claim 16, wherein the refractivity of the silicon oxynitride layer and thicknesses of the silicon oxynitride layer and the silicon dioxide layer are determined depending on a thickness of the ITO layer, so that the reflectivity of the patterned region and the reflectivity of the non-patterned region are approximately equal or equal with each other;

the refractivity of the silicon oxynitride layer is adjusted by adjusting a ratio of oxygen atoms and nitrogen atoms within the silicon oxynitride layer during a disposition process thereof.

18. The touch screen according claim 17, wherein the silicon dioxide layer is configured to protect the ITO layer.

* * * * *